US012658144B2

(12) United States Patent
An et al.

(10) Patent No.: US 12,658,144 B2
(45) Date of Patent: Jun. 16, 2026

(54) SECURITY DEVICE, DISPLAY DEVICE, AND ELECTRONIC DEVICE INCLUDING THE SECURITY DEVICE

(71) Applicant: Samsung Display Co., Ltd., Yongin-Si (KR)

(72) Inventors: Jungeon An, Yongin-si (KR); Kihyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/051,165

(22) Filed: Feb. 12, 2025

(65) Prior Publication Data

US 2026/0038446 A1 Feb. 5, 2026

(30) Foreign Application Priority Data

Aug. 2, 2024 (KR) ......................... 10-2024-0102860

(51) Int. Cl.
| | |
|---|---|
| *G09G 3/3275* | (2016.01) |
| *G06F 21/86* | (2013.01) |
| *G09G 3/3266* | (2016.01) |

(52) U.S. Cl.
CPC ........... *G09G 3/3275* (2013.01); *G06F 21/86* (2013.01); *G09G 3/3266* (2013.01); *G09G 2358/00* (2013.01)

(58) Field of Classification Search
CPC ............... G09G 3/3275; G09G 3/3266; G09G 2358/00; G06F 21/86
See application file for complete search history.

(56) References Cited

U.S. PATENT DOCUMENTS

| | | | |
|---|---|---|---|
| 10,733,408 B2 | 8/2020 | Bok | |
| 2021/0217358 A1* | 7/2021 | Lee | ..................... G06V 40/1382 |
| 2023/0359761 A1* | 11/2023 | Hanson | .................. G16H 20/10 |

FOREIGN PATENT DOCUMENTS

KR 10-2024-0005627 A 1/2024

* cited by examiner

*Primary Examiner* — Nitin Patel
*Assistant Examiner* — Amen W Bogale
(74) *Attorney, Agent, or Firm* — Innovation Counsel LLP

(57) ABSTRACT

A security device includes a summing circuit configured to receive a key signal and generate a merged signal by summing a lock signal and the key signal, a check voltage generating circuit configured to generate a check voltage having a voltage level corresponding to a duration of an on-period of the merged signal, and a check circuit configured to check whether the merged signal exceeds a comparison voltage, to check whether the check voltage is within a normal check voltage range, and to generate an OK signal having an on-level if the merged signal does not exceed the comparison voltage and the check voltage is within the normal check voltage range.

19 Claims, 9 Drawing Sheets

F I G. 1

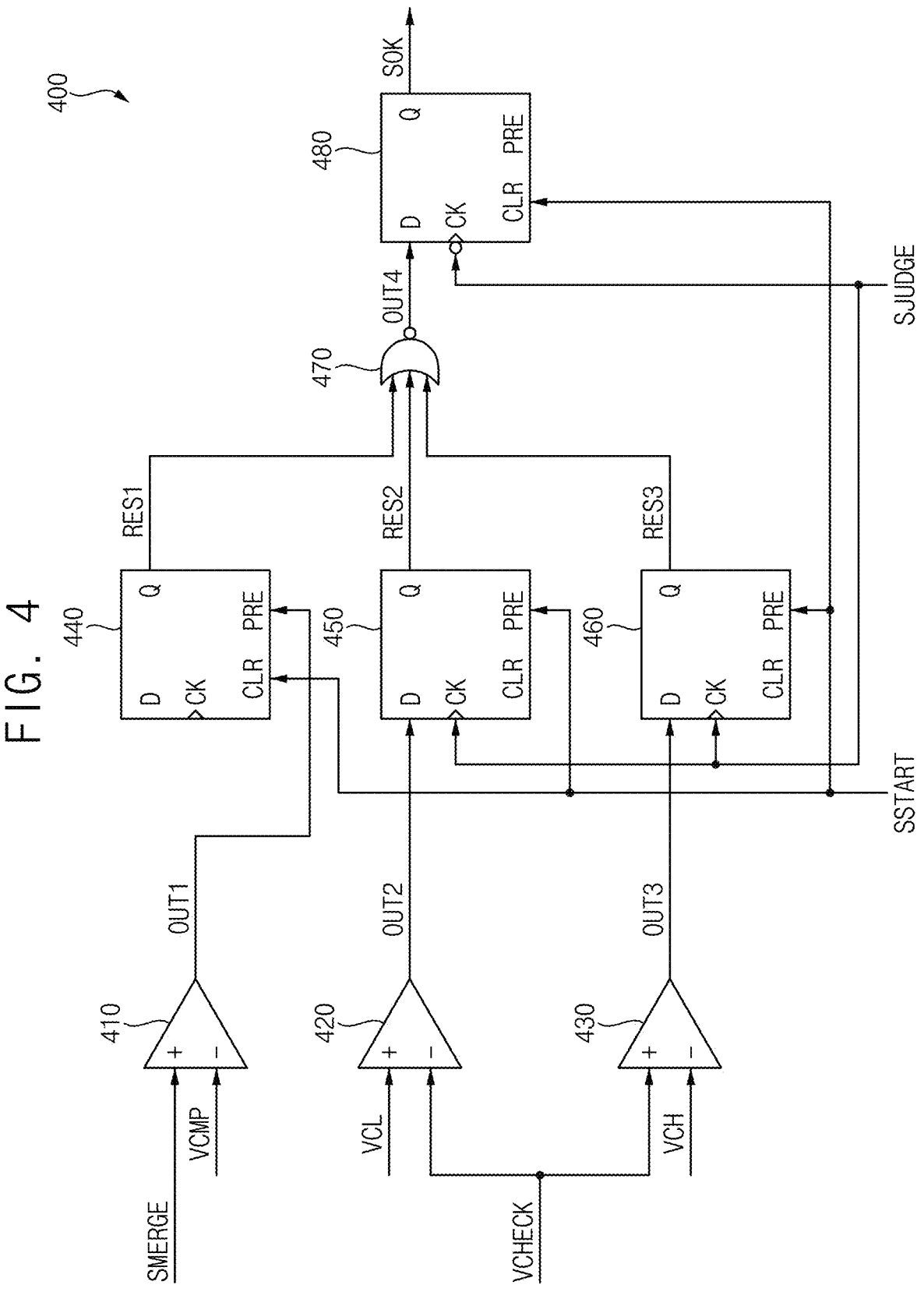
F I G. 4

FIG. 9

SECURITY DEVICE, DISPLAY DEVICE, AND ELECTRONIC DEVICE INCLUDING THE SECURITY DEVICE

CROSS-REFERENCE TO RELATED APPLICATION(S)

This application claims priority, under 35 USC § 119, to Korean Patent Application No. 10-2024-0102860 filed on Aug. 2, 2024 in the Korean Intellectual Property Office (KIPO), the content of which is incorporated by reference herein in its entirety.

BACKGROUND

1. Field

The present inventive concept relates to a display device, and more particularly to a security device using a lock signal, and a display device including the security device.

2. Description of the Related Art

An electronic device, such as a display device, may be reverse engineered by being connected to an unauthorized analysis device or system and being driven and analyzed by the analysis device. A software security technique or a digital security technique may be applied to the electronic device to prevent the reverse engineering. However, the software security technique or the digital security technique may not completely prevent the reverse engineering.

SUMMARY

Some embodiments provide a security device capable of preventing reverse engineering.

Some embodiments provide a display device including a security device capable of preventing reverse engineering.

According to embodiments, there is provided a security device including a summing circuit configured to receive a key signal, and generate a merged signal by summing a lock signal and the key signal, a check voltage generating circuit configured to generate a check voltage having a voltage level corresponding to a duration of an on-period of the merged signal, and a check circuit configured to check whether the merged signal exceeds a comparison voltage, to check whether the check voltage is within a normal check voltage range, and to generate an OK signal having an on-level if the merged signal does not exceed the comparison voltage and the check voltage is within the normal check voltage range.

In embodiments, the check circuit may generate the OK signal having the on-level if the key signal is complementary to the lock signal, and may generate the OK signal having an off-level if the key signal is not complementary to the lock signal.

In embodiments, the summing circuit may generate the merged signal higher than the comparison voltage when the lock signal and the key signal have a high level simultaneously, and the check circuit may generate the OK signal having an off-level based on the merged signal being higher than the comparison voltage.

In embodiments, the check voltage generating circuit may generate the check voltage that is outside of the normal check voltage range when the duration of the on-period of the merged signal does not match a selected duration, and the check circuit may generate the OK signal having an off-level based on the check voltage being outside of the normal check voltage range.

In embodiments, the summing circuit may include an operational amplifier including an inverting input terminal, a non-inverting input terminal, and an output terminal at which the merged signal is output, a first resistor including a first terminal which receives a ground voltage, and a second terminal connected to the inverting input terminal, a second resistor including a first terminal connected to the inverting input terminal, and a second terminal connected to the output terminal, a third resistor including a first terminal which receives the lock signal, and a second terminal connected to the non-inverting input terminal, and a fourth resistor including a first terminal which receives the key signal, and a second terminal connected to the non-inverting input terminal.

In embodiments, the check voltage generating circuit may include a constant current source configured to output a constant current during the on-period of the merge signal, and a capacitor configured to generate the check voltage based on the constant current.

In embodiments, the constant current source may include an enable terminal which receives the merge signal, and a current output terminal at which the constant current is output, and the capacitor may include a first electrode connected to the current output terminal, and a second electrode which receives a ground voltage.

In embodiments, the check circuit may include a first comparator configured to compare the merged signal with the comparison voltage, a second comparator configured to compare the check voltage with a check low voltage that marks a lower limit of the normal check voltage range, a third comparator configured to compare the check voltage with a check high voltage that marks an upper limit of the normal check voltage range, a first flip-flop configured to generate a first result signal indicating whether the merged signal exceeds the comparison voltage based on a first output signal of the first comparator, a second flip-flop configured to generate a second result signal indicating whether the check voltage is lower than the check low voltage based on a second output signal of the second comparator, a third flip-flop configured to generate a third result signal indicating whether the check voltage is higher than the check high voltage based on a second output signal of the third comparator, a NOR gate configured to perform a NOR operation on the first result signal, the second result signal and the third result signal, and a fourth flip-flop configured to output a fourth output signal of the NOR gate as the OK signal in response to a judgment signal.

In embodiments, the first comparator may include a non-inverting input terminal which receives the merge signal, an inverting input terminal which receives the comparison voltage, and an output terminal outputting the first output signal, the first output signal having a high level when the merge signal is higher than the comparison voltage and having a low level when the merge signal is lower than the comparison voltage, the second comparator may include a non-inverting input terminal which receives the check low voltage, an inverting input terminal which receives the check voltage, and an output terminal outputting the second output signal having a low level when the check voltage is higher than the check low voltage and having a high level when the check voltage is lower than the check low voltage is output, and the third comparator may include a non-inverting input terminal which receives the check voltage, an inverting input terminal which receives the check high voltage, and an output terminal outputting the third output signal, the third output signal having a low level when the check voltage is lower than the check high voltage and having a high level when the check voltage is higher than the check high voltage.

In embodiments, the first flip-flop may include a clear terminal which receives a start signal, a preset terminal which receives the first output signal, and an output terminal outputting the first result signal, the first result signal having a low level when the first output signal is maintained at a low level and having a high level when the first output signal changes to a high level, the second flip-flop may include a preset terminal which receives the start signal, a data input terminal which receives the second output signal, a clock terminal which receives the judgment signal, and an output terminal outputting the second result signal, wherein the second output signal is output as the second result signal at a rising edge of the judgment signal, and the third flip-flop may include a preset terminal which receives the start signal, a data input terminal which receives the third output signal, a clock terminal which receives the judgment signal, and an output terminal outputting the third output signal is output as the third result signal at the rising edge of the judgment signal.

In embodiments, the NOR gate may include a first input terminal which receives the first result signal, a second input terminal which receives the second result signal, a third input terminal which receives the third result signal, and an output terminal outputting the fourth output signal, the fourth output signal having a high level if the first, second and third result signals simultaneously have a low level, and the fourth output signal having a low level when at least one of the first, second and third result signals has a high level, and the fourth flip-flop may include a clear terminal which receives the start signal, a data input terminal which receives the fourth output signal, a clock terminal which receives the judgment signal, and an output terminal outputting the fourth output signal as the OK signal at a falling edge of the judgment signal.

In embodiments, the check circuit may provide the OK signal to a controller of a display device. The controller may operate normally when the OK signal has the on-level, and may not operate when the OK signal has an off-level.

According to embodiments, there is provided a display device including a display panel including a plurality of pixels, a data driver configured to provide data signals to the plurality of pixels, a scan driver configured to provide scan signals to the plurality of pixels, a controller configured to control the data driver and the scan driver, and to generate a lock signal, and a security device configured to receive a key signal from an external device, and to generate an OK signal having an on-level when the key signal fits with the lock signal. The controller operates normally when the OK signal has the on-level, and does not operate when the OK signal has an off-level.

In embodiments, the security device may include a summing circuit configured to generate a merged signal by summing the lock signal and the key signal, a check voltage generating circuit configured to generate a check voltage having a voltage level corresponding to a duration of an on-period of the merged signal, and a check circuit configured to check whether the merged signal exceeds a comparison voltage, to check whether the check voltage is within a normal check voltage range, and to generate the OK signal having the on-level if the merged signal does not exceed the comparison voltage and the check voltage is within the normal check voltage range.

In embodiments, the summing circuit may generate the merged signal higher than the comparison voltage when the lock signal and the key signal have a high level at a same time, and the check circuit may generate the OK signal having the off-level based on the merged signal higher than the comparison voltage.

In embodiments, the check voltage generating circuit may generate the check voltage that is outside of the normal check voltage range when the duration of the on-period of the merged signal does not match a selected duration, and the check circuit may generate the OK signal having the off-level based on the check voltage being outside of the normal check voltage range.

In embodiments, the summing circuit may include an operational amplifier including an inverting input terminal, a non-inverting input terminal, and an output terminal at which the merged signal is output, a first resistor including a first terminal which receives a ground voltage, and a second terminal connected to the inverting input terminal, a second resistor including a first terminal connected to the inverting input terminal, and a second terminal connected to the output terminal, a third resistor including a first terminal which receives the lock signal, and a second terminal connected to the non-inverting input terminal, and a fourth resistor including a first terminal which receives the key signal, and a second terminal connected to the non-inverting input terminal.

In embodiments, the check voltage generating circuit may include a constant current source configured to output a constant current during the on-period of the merge signal, and a capacitor configured to generate the check voltage based on the constant current.

In embodiments, the check circuit may include a first comparator configured to compare the merged signal with the comparison voltage, a second comparator configured to compare the check voltage with a check low voltage that marks a lower limit of the normal check voltage range, a third comparator configured to compare the check voltage with a check high voltage that marks an upper limit of the normal check voltage range, a first flip-flop configured to generate a first result signal indicating whether the merged signal exceeds the comparison voltage based on a first output signal of the first comparator, a second flip-flop configured to generate a second result signal indicating whether the check voltage is lower than the check low voltage based on a second output signal of the second comparator, a third flip-flop configured to generate a third result signal indicating whether the check voltage is higher than the check high voltage based on a second output signal of the third comparator, a NOR gate configured to perform a NOR operation on the first result signal, the second result signal and the third result signal, and a fourth flip-flop configured to output a fourth output signal of the NOR gate as the OK signal in response to a judgment signal.

In embodiments, the first comparator may include a non-inverting input terminal which receives the merge signal, an inverting input terminal which receives the comparison voltage, and an output terminal outputting the first output signal, the first output signal having a high level when the merge signal is higher than the comparison voltage and having a low level when the merge signal is lower than the comparison voltage, the second comparator may include a non-inverting input terminal which receives the check low voltage, an inverting input terminal which receives the check voltage, and an output terminal outputting the second output signal, the second output signal having a low level when the check voltage is higher than the check low voltage and having a high level when the check voltage is lower than the check low voltage, the third comparator may include a non-inverting input terminal which receives the check voltage, an inverting input terminal which receives the check high voltage, and an output terminal outputting the third output signal, the third output signal having a low level when the check voltage is lower than the check high voltage and having a high level when the check voltage is higher than the check high voltage, the first flip-flop may include a clear terminal which receives a start signal, a preset terminal which receives the first output signal, and an output terminal outputting the first result signal, the first result signal having a low level when the first output signal is maintained at a low level and having a high level when the first output signal changes to a high level, the second flip-flop may include a preset terminal which receives the start signal, a data input terminal which receives the second output signal, a clock terminal which receives the judgment signal, and an output terminal outputting the second result signal, wherein the second output signal is output as the second result signal at a rising edge of the judgment signal, the third flip-flop may include a preset terminal which receives the start signal, a data input terminal which receives the third output signal, a clock terminal which receives the judgment signal, and an output terminal outputting the third result signal, wherein the third output signal is output as the third result signal at the rising edge of the judgment signal, the NOR gate may include a first input terminal which receives the first result signal, a second input terminal which receives the second result signal, a third input terminal which receives the third result signal, and an output terminal outputting the fourth output signal, the fourth output signal having a high level if all of the first, second and third result signals simultaneously have a low level and having a low level when at least one of the first, second and third result signals has a high level, and the fourth flip-flop may include a clear terminal which receives the start signal, a data input terminal which receives the fourth output signal, a clock terminal which receives the judgment signal, and an output terminal outputting the fourth output signal as the OK signal at a falling edge of the judgment signal.

According to embodiments, there is provided an electronic device including a processor configured to provide input image data, and a display device configured to receive the input image data from the processor, and to display an image based on the input image data. The display device includes a display panel including a plurality of pixels, a data driver configured to provide data signals to the plurality of pixels, a scan driver configured to provide scan signals to the plurality of pixels, a controller configured to control the data driver and the scan driver, and to generate a lock signal, and a security device configured to receive a key signal from an external device, and to generate an OK signal having an on-level when the key signal fits with the lock signal. The controller operates normally when the OK signal has the on-level, and does not operate when the OK signal has an off-level.

As described above, in a security device and a display device including the security device according to embodiments, the security device may receive a key signal from an external device, and may generate an OK signal having an on-level only if the key signal fits with a lock signal (e.g., when the key signal is complementary to the lock signal). Further, the display device may normally operate only while the OK signal has the on-level. Accordingly, security of the display device, any electronic device or any electronic system including the security device may be maintained.

BRIEF DESCRIPTION OF THE DRAWINGS

Illustrative, non-limiting embodiments will be more clearly understood from the following detailed description in conjunction with the accompanying drawings.

FIG. 1 is a block diagram illustrating a security device according to embodiments.

FIG. 4 is a diagram illustrating an example of a check circuit included in a security device according to embodiments.

FIG. 9 is a block diagram illustrating a display device including a security device according to embodiments.

DETAILED DESCRIPTION OF THE EMBODIMENTS

Figure 2:
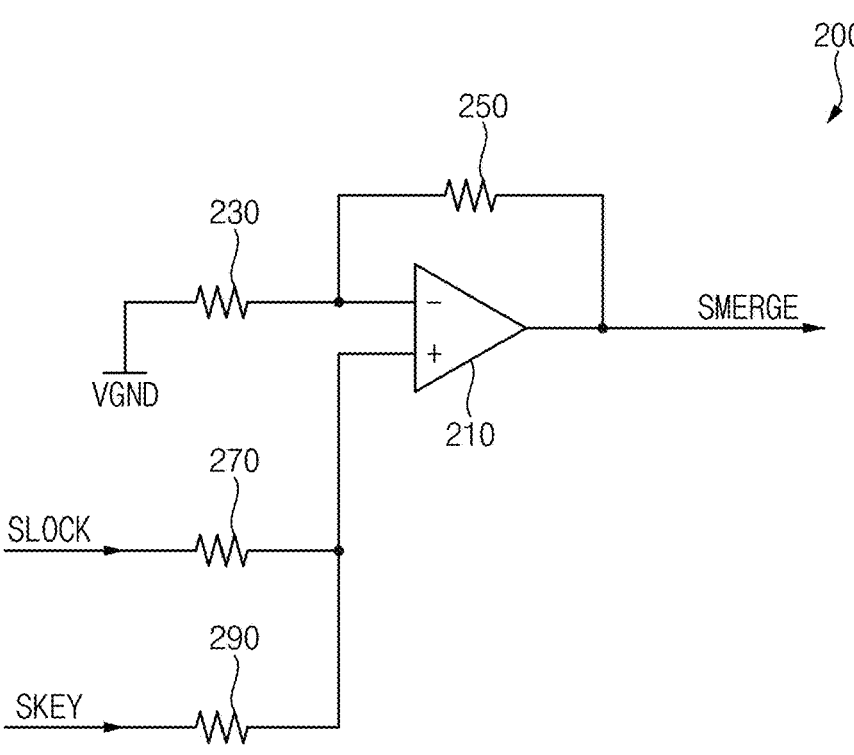
FIG. 2 is a diagram illustrating an example of a summing circuit included in a security device according to embodiments.

The embodiments are described more fully hereinafter with reference to the accompanying drawings. Like or similar reference numerals refer to like or similar elements throughout.

Figure 1:
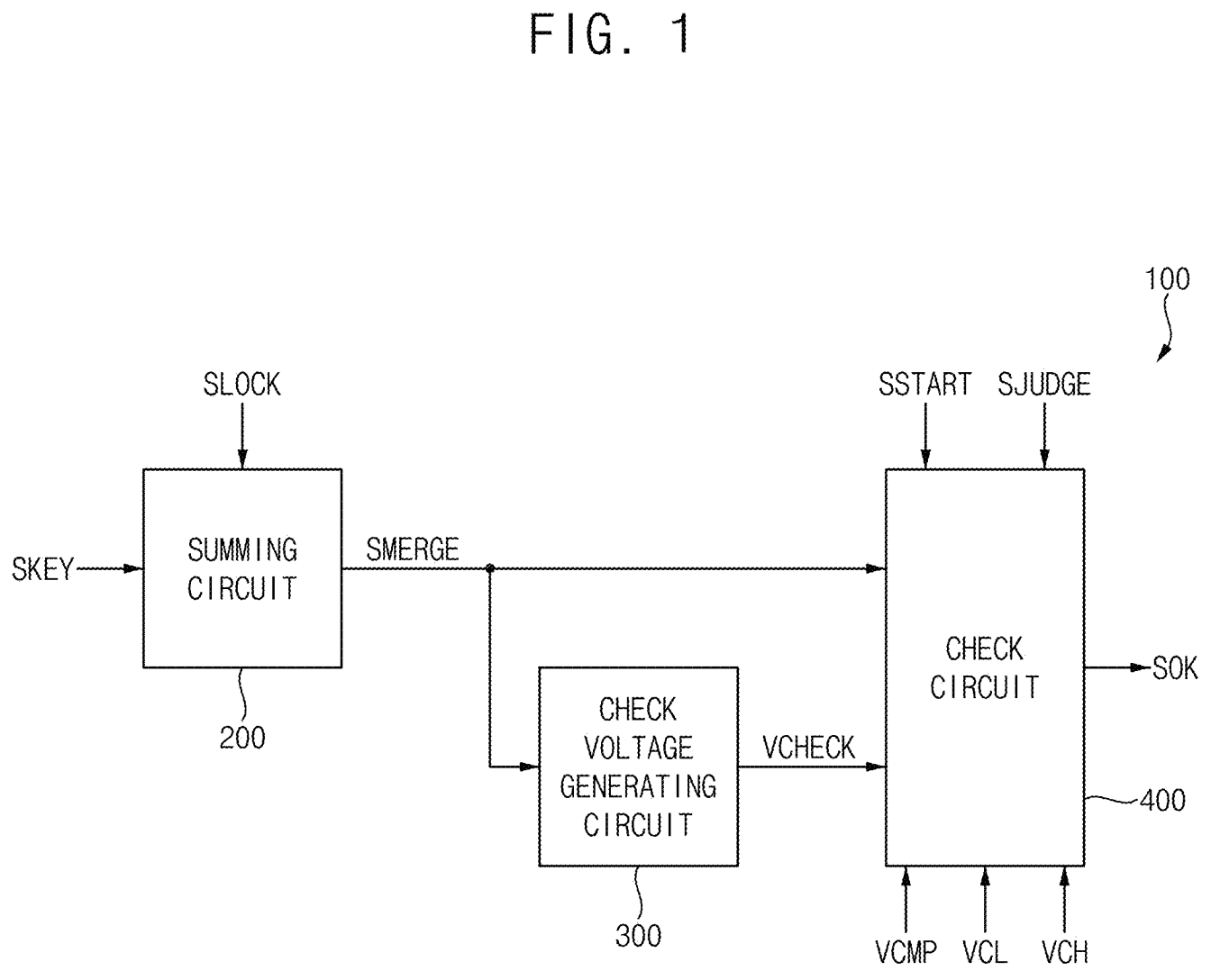
Figure 3:
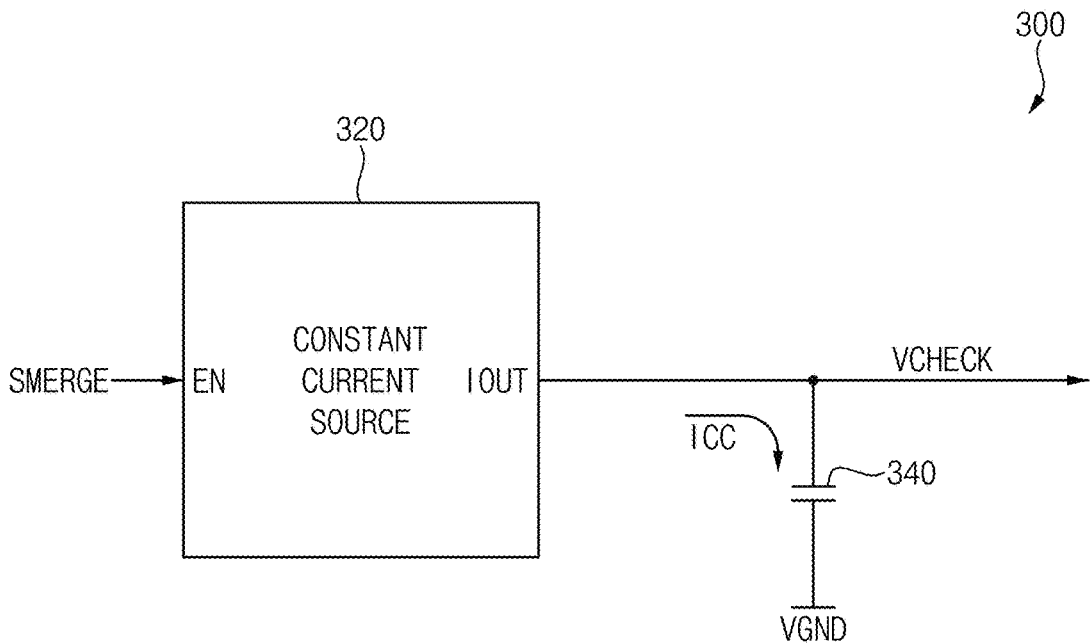
FIG. 3 is a diagram illustrating an example of a check voltage generating circuit included in a security device according to embodiments.

FIG. 1 is a block diagram illustrating a security device according to embodiments, FIG. 2 is a diagram illustrating an example of a summing circuit included in a security device according to embodiments, FIG. 3 is a diagram illustrating an example of a check voltage generating circuit included in a security device according to embodiments, and FIG. 4 is a diagram illustrating an example of a check circuit included in a security device according to embodiments.

Referring to FIG. 1, a security device 100 according to embodiments may include a summing circuit 200, a check voltage generating circuit 300 and a check circuit 400. In some embodiments, the security device 100 may be included in, but is not limited to a display device. According to embodiments, the security device 100 may be included in any electronic device which requires security, or any electronic device which requires prevention of reverse engineering.

The summing circuit 200 may receive a key signal SKEY from an external device, and may generate a merged signal SMERGE by summing a lock signal SLOCK and the key signal SKEY In some embodiments, the lock signal SLOCK may be generated inside an electronic device including the security device 100, and may be a selected (or predetermined) signal of which timing and level are selected or previously determined. For example, when the security device 100 is included in the display device, the summing circuit 200 may receive the lock signal SLOCK from, but not limited to, a controller of the display device.

In some embodiments, to generate the merged signal SMERGE by summing the lock signal SLOCK and the key signal SKEY, as illustrated in FIG. 2, the summing circuit 200 may be implemented as a non-inverting summing amplifier circuit. For example, the summing circuit 200 may include an operational amplifier 210, a first resistor 230, a second resistor 250, a third resistor 270 and a fourth resistor 290.

The operational amplifier 210 may include an inverting input terminal connected to the first resistor 230 and the second resistor 250, a non-inverting input terminal connected to the third resistor 270 and the fourth resistor 290, and an output terminal at which the merge signal SMERGE is output. The first resistor 230 may include a first terminal which receives a ground voltage VGND, and a second terminal connected to the inverting input terminal of the operational amplifier 210. The second resistor 250 may include a first terminal connected to the inverting input terminal of the operational amplifier 210, and a second terminal connected to the output terminal of the operational amplifier 210. The third resistor 270 may include a first terminal which receives the lock signal SLOCK, and a second terminal connected to the non-inverting input terminal of the operational amplifier 210. The fourth resistor 290 may include a first terminal which receives the key signal SKEY, and a second terminal connected to the non-inverting input terminal of the operational amplifier 210. In some embodiments, the first resistor 230, the second resistor 250, the third resistor 270, and the fourth resistor 290 may have substantially the same resistance value. In this case, the summing circuit 200 may generate the merged signal SMERGE having a voltage obtained by summing a voltage of the lock signal SLOCK and a voltage of the key signal SKEY The check voltage generating circuit 300 may generate a check voltage VCHECK having a voltage level corresponding to a duration of an on-period of the merged signal SMERGE. In some embodiments, the merged signal SMERGE may have a high level as an on-level, and the on-period of the merged signal SMERGE may be a high period of the merged signal SMERGE. Further, in some embodiments, the check voltage generating circuit 300 may increase the voltage level of the check voltage VCHECK as time passes during the on-period of the merge signal SMERGE, as shown by the upward slope of check voltage VCHECK in FIG. 5.

In some embodiments, to generate the check voltage VCHECK having the voltage level corresponding to the duration of the on-period of the merge signal SMERGE, as illustrated in FIG. 3, the check voltage generating circuit 300 may include a constant current source 320 that outputs a constant current ICC having a substantially constant current level, and a capacitor 340 that generates the check voltage VCHECK based on the constant current ICC.

The constant current source 320 may include an enable terminal EN which receives the merge signal SMERGE, and a current output terminal IOUT at which the constant current ICC is output. The constant current source 320 may output the constant current ICC at the current output terminal IOUT when the merge signal SMERGE applied to the enable terminal EN has an on-level (e.g., a high level). Thus, the constant current source 320 may output the constant current ICC during the on-period (e.g., the high period) of the merge signal SMERGE. The capacitor 340 can include a first electrode connected to the current output terminal IOUT of the constant current source 320, and a second electrode which receives the ground voltage VGND. The capacitor 340 may be charged by the constant current ICC output from the current output terminal IOUT of the constant current source 320, and thus a voltage of the first electrode of the capacitor 340 may increase as a time period during which the constant current ICC is output increases. Accordingly, as the duration of the on-period (e.g., the high period) of the merge signal SMERGE increases, a voltage level of the voltage of the first electrode of the capacitor 340, or the check voltage VCHECK may increase.

The check circuit 400 may check whether the merge signal SMERGE exceeds a comparison voltage VCMP, and may check whether the check voltage VCHECK is within a normal check voltage range. If the merge signal SMERGE does not exceed the comparison voltage VCMP and the check voltage VCHECK is within the normal check voltage range, the check circuit 400 may generate an OK signal SOK having an on-level (e.g., a high level). Further, if the merge signal SMERGE exceeds the comparison voltage VCMP or the check voltage VCHECK is out of the normal check voltage range, the check circuit 400 may generate the OK signal SOK having an off-level (e.g., a low level).

In some embodiments, in a case where the key signal SKEY fits with the lock signal SLOCK, which is the selected (or predetermined) signal, the check circuit 400 may generate the OK signal SOK having the on-level. The key signal SKEY "fitting with" the lock signal SLOCK means the key signal SKEY meets a predefined criteria for the lock signal SLOCK (e.g., the key signal SKEY is complementary to the lock signal SLOCK). Further, the key signal SKEY fitting with the lock signal SLOCK may mean that, during a selected time period, the key signal SKEY may have a low level when the lock signal SLOCK has a high level, and the key signal SKEY may have the high level when the lock signal SLOCK has the low level. In contrast, if the key signal SKEY does not fit with the lock signal SLOCK (e.g., in a case where the key signal SKEY is not complementary to the lock signal SLOCK), the check circuit 400 may generate the OK signal SOK having the off-level.

For example, as described below with reference to FIG. 5, during the selected time period, if the key signal SKEY is complementary to the lock signal SLOCK or if the key signal SKEY has the low level when the lock signal SLOCK has the high level, or the key signal SKEY has the high level when the lock signal SLOCK has the low level, a voltage level of the merged signal SMERGE generated by summing the lock signal SLOCK and the key signal SKEY may be lower than a voltage level of the comparison voltage VCMP. Thus, the merge signal SMERGE may be lower than the comparison voltage VCMP during the selected time period. Further, in this case, the merge signal SMERGE may have the on-level (e.g., the high level) during the selected time period, and the duration of the on-period (e.g., the high period) of the merge signal SMERGE may match a duration of the selected time period, or a selected duration. Thus, in this case, the check voltage VCHECK during the on-period of the merge signal SMERGE may be between a check low voltage VCL that marks a lower limit of the normal check voltage range and a check high voltage VCH that marks an upper limit of the normal check voltage range. That is, if the key signal SKEY is complementary to the lock signal SLOCK during the selected time period, the merge signal SMERGE may be lower than the comparison voltage VCMP, the check voltage VCHECK may be within the normal check voltage range, and thus the check circuit 400 may generate the OK signal SOK having the on-level.

In another example, as described below with reference to FIG. 6, in a case where the lock signal SLOCK and the key signal SKEY substantially simultaneously have high levels within the selected time period, the summing circuit 200 may generate the merge signal SMERGE having a voltage level higher than the voltage level of the comparison voltage VCMP. If the voltage level of the merge signal SMERGE is higher than the voltage level of the comparison voltage VCMP, or if the merge signal SMERGE exceeds the comparison voltage VCMP, the check circuit 400 may generate the OK signal SOK having the off-level. In still another example, as described below with reference to FIG. 7, in a case where the lock signal SLOCK and the key signal SKEY substantially simultaneously have low levels at any time point within the selected time period, or in a case where a low period of the lock signal SLOCK and a low period of the key signal SKEY at least partially overlap each other, the duration of the on-period of the merge signal SMERGE may not match the selected duration. In this case, the check voltage generating circuit 300 may generate the check voltage VCHECK that is outside of the normal check voltage range (e.g., the check voltage VCHECK lower than the check low voltage VCL), and the check circuit 400 may generate the OK signal SOK having the off-level based on the check voltage VCHECK being outside of the normal check voltage range. That is, if the key signal SKEY does not fit with the lock signal SLOCK, or if the key signal SKEY is not complementary to the lock signal SLOCK during the selected time period, the merge signal SMERGE may exceed the comparison voltage VCMP or the check voltage VCHECK may be out of the normal check voltage range, and thus the check circuit 400 may generate the OK signal SOK having the off-level.

In some embodiments, to generate the OK signal SOK by checking whether the merge signal SMERGE exceeds the comparison voltage VCMP and by checking whether the check voltage VCHECK is within the normal check voltage range, as illustrated in FIG. 4, the check circuit 400 may include a first comparator 410, a second comparator 420, a third comparator 430, a first flip-flop 440, a second flip-flop 450, a third flip-flop 460, a NOR gate 470 and a fourth flip-flop 480.

The first comparator 410 may generate a first output signal OUT1 by comparing the merge signal SMERGE with the comparison voltage VCMP, and the first flip-flop 440 may generate a first result signal RES1 indicating whether the merge signal SMERGE exceeds the comparison voltage VCMP (e.g., whether the merge signal SMERGE is higher than the comparison voltage VCMP) based on the first output signal OUT1 of the first comparator 410. In some embodiments, the first comparator 410 may include a non-inverting input terminal which receives the merge signal SMERGE, an inverting input terminal which receives the comparison voltage VCMP, and an output terminal at which the first output signal OUT1 is output. Thus, the first comparator 410 may output the first output signal OUT1 having a high level when the merge signal SMERGE is higher than the comparison voltage VCMP, and may output the first output signal OUT1 having a low level when the merge signal SMERGE is lower than the comparison voltage VCMP. Further, in some embodiments, the first flip-flop 440 may include a clear terminal CLR which receives a start signal SSTART, a preset terminal PRE which receives the first output signal OUT1, and an output terminal Q at which the first result signal RES1 is output. Thus, the first flip-flop 440 may initialize the first result signal RES1 to a low level in response to the start signal SSTART. Thereafter, when the first output signal OUT1 is maintained at a low level (e.g., until a judgment signal SJUDGE is applied), the first flip-flop 440 may output the first result signal RES1 having a low level. In contrast, when the first output signal SOUT1 changes to a high level, the first flip-flop 440 may output the first result signal RES1 having a high level. In some embodiments, the first flip-flop 440 may further include a data input terminal D and a clock terminal CK having a floating state or a high impedance state.

For example, during a time period from when the start signal SSTART is applied to when the judgment signal SJUDGE is applied, if the merge signal SMERGE is lower than the comparison voltage VCMP, the first comparator 410 may output the first output signal OUT1 having the low level, and the first flip-flop 440 may output the first result signal RES1 having the low level. Thus, the first result signal RES1 having the low level may indicate that the merge signal SMERGE is lower than the comparison voltage VCMP, or that the merge signal SMERGE does not exceed the comparison voltage VCMP. In contrast, at any time point within the time period, if the merge signal SMERGE is higher than the comparison voltage VCMP, the first comparator 410 may output the first output signal OUT1 having the high level, and the first flip-flop 440 may output the first result signal RES1 having the high level. Thus, the first result signal RES1 having the high level may indicate that the merge signal SMERGE is higher than the comparison voltage VCMP, or that the merge signal SMERGE exceeds the comparison voltage VCMP.

The second comparator 420 may generate a second output signal OUT2 by comparing the check voltage VCHECK with the check low voltage VCL that marks the lower limit of the normal check voltage range, and the second flip-flop 450 may generate a second result signal RES2 indicating whether the check voltage VCHECK is lower than the check low voltage VCL based on the second output signal OUT2 of the second comparator 420. In some embodiments, the second comparator 420 may include a non-inverting input terminal which receives the check low voltage VCL, an inverting input terminal which receives the check voltage VCHECK, and an output terminal at which the second output signal OUT2 is output. Thus, the second comparator 420 may output the second output signal OUT2 having a low level when the check voltage VCHECK is higher than the check low voltage VCL, and may output the second output signal OUT2 having a high level when the check voltage VCHECK is lower than the check low voltage VCL. Further, in some embodiments, the second flip-flop 450 may include a preset terminal PRE which receives the start signal SSTART, a data input terminal D which receives the second output signal OUT2, a clock terminal CK which receives the judgment signal SJUDGE, and an output terminal Q at which the second result signal RES2 is output. Further, the second flip-flop 450 may be a rising edge triggered D-flip flop that operates at a rising edge of the judgment signal SJUDGE applied to the clock terminal CK. Thus, the second flip-flop 450 may initialize the first result signal RES1 to a high level in response to the start signal SSTART. Thereafter, at the rising edge of the judgment signal SJUDGE, the second flip-flop 450 may output the second result signal RES2 having a low level if the second output signal OUT2 has a low level, and may output the second result signal RES2 having a high level if the second output signal OUT2 has a high level. In some embodiments, the second flip-flop 450 may further include a clear terminal CLR having a floating state or a high impedance state.

For example, at the rising edge of the judgment signal SJUDGE, if the check voltage VCHECK is within the normal check voltage range, or if the check voltage VCHECK is higher than the check low voltage VCL, the second comparator 420 may output the second output signal OUT2 having the low level, and the second flip-flop 450 may output the second result signal RES2 having the low level. Thus, at the rising edge of the judgment signal SJUDGE, the second result signal RES2 having the low level may indicate that the check voltage VCHECK is higher than the check low voltage VCL. In contrast, at the rising edge of the judgment signal SJUDGE, if the check voltage VCHECK is lower than the check low voltage VCL, the second comparator 420 may output the second output signal OUT2 having the high level, and the second flip-flop 450 may output the second result signal RES2 having the high level. Thus, at the rising edge of the judgment signal SJUDGE, the second result signal RES2 having the high level may indicate that the check voltage VCHECK is lower than the check low voltage VCL, or that the check voltage VCHECK is out of the normal check voltage range.

The third comparator 430 may generate a third output signal OUT3 by comparing the check voltage VCHECK with the check high voltage VCH that marks the upper limit of the normal check voltage range, and the third flip-flop 460 may generate a third result signal RES3 indicating whether the check voltage VCHECK is higher than the check high voltage VCH based on the third output signal OUT3 of the third comparator 430. In some embodiments, the third comparator 430 may include a non-inverting input terminal which receives the check voltage VCHECK, an inverting input terminal which receives the check high voltage VCH, and an output terminal at which the third output signal OUT3 is output. Thus, the third comparator 430 may output the third output signal OUT3 having a low level when the check voltage VCHECK is lower than the check high voltage VCH, and may output the third output signal OUT3 having a high level when the check voltage VCHECK is higher than the check high voltage VCH. Further, in some embodiments, the third flip-flop 460 may include a preset terminal PRE which receives the start signal SSTART, a data input terminal D which receives the third output signal OUT3, a clock terminal CK which receives the judgment signal SJUDGE, and an output terminal Q at which the third result signal RES3 is output. Further, the third flip-flop 460 may be a rising edge triggered D-flip-flop that operates at the rising edge of the judgment signal SJUDGE applied to the clock terminal CK. Thus, the third flip-flop 460 may initialize the second result signal RES2 to a high level in response to the start signal SSTART. Thereafter, at the rising edge of the judgment signal SJUDGE, the third flip-flop 460 may output the third output signal OUT3 as the third result signal RES3. That is, at the rising edge of the judgment signal SJUDGE, the third flip-flop 460 may output the third result signal RES3 having a low level when the third output signal OUT3 has a low level, and may output the third result signal RES3 having a high level when the third output signal OUT3 has a high level. In some embodiments, the third flip-flop 460 may further include a clear terminal CLR having a floating state or a high impedance state.

For example, at the rising edge of the judgment signal SJUDGE, if the check voltage VCHECK is within the normal check voltage range, or if the check voltage VCHECK is lower than the check high voltage VCH, the third comparator 430 may output the third output signal OUT3 having the low level, and the third flip-flop 460 may output the third result signal RES3 having the low level.

Thus, at the rising edge of the judgment signal SJUDGE, the third result signal RES3 having the low level may indicate that the check voltage VCHECK is lower than the check high voltage VCH. In contrast, at the rising edge of the judgment signal SJUDGE, if the check voltage VCHECK is higher than the check high voltage VCH, the third comparator 430 may output the third output signal OUT3 having the high level, and the third flip-flop 460 may output the third result signal RES3 having the high level. Thus, at the rising edge of the judgment signal SJUDGE, the third result signal RES3 having the high level may indicate that the check voltage VCHECK is higher than the check high voltage VCH, or that the check voltage VCHECK is out of the normal check voltage range.

The NOR gate 470 may generate a fourth output signal OUT4 by performing a NOR operation on the first result signal RES1, the second result signal RES2 and the third result signal RES3. In some embodiments, the NOR gate 470 may include a first input terminal which receives a first result signal RES1, a second input terminal which receives a second result signal RES2, a third input terminal which receives a third result signal RES3, and an output terminal at which the fourth output signal OUT4 is output. Thus, the NOR gate 470 may output the fourth output signal OUT4 having a high level when all of the first, second and third result signals RES1, RES2 and RES3 have low levels, and may output the fourth output signal OUT4 having a low level when at least one of the first, second and third result signals RES1, RES2 and RES3 has a high level.

The fourth flip-flop 480 may output the fourth output signal OUT4 of the NOR gate 470 as the OK signal SOK in response to the judgment signal SJUDGE. In some embodiments, the fourth flip-flop 480 may include a clear terminal CLR which receives the start signal SSTART, a data input terminal D which receives the fourth output signal OUT4, a clock terminal CK which receives the judgment signal SJUDGE, and an output terminal Q at which the fourth output signal OUT4 is output. Further, the fourth flip-flop 480 may be a falling edge triggered D-flip flop that operates at a falling edge of the judgment signal SJUDGE applied to the clock terminal CK. Thus, the fourth flip-flop 480 may initialize the OK signal SOK to a low level in response to the start signal SSTART. Thereafter, at the falling edge of the judgment signal SJUDGE, the fourth flip-flop 480 may output the fourth output signal OUT4 as the OK signal SOK.

The OK signal SOK output from the fourth flip-flop 480 may be provided to the electronic device including the security device 100. The electronic device may operate normally in response to the OK signal SOK having the on-level (e.g., the high level), and may not operate in response to the OK signal SOK having the off-level (e.g., the low level). In some embodiments, the security device 100 may be included in the display device, and the OK signal SOK may be provided to the controller of the display device. The controller may operate normally if the OK signal SOK has the on-level, and may not operate if the OK signal SOK has the off-level. Thus, in a case where the display device is connected to an unauthorized analysis device or system, the unauthorized analysis device or system may not provide the key signal SKEY that matches the lock signal SLOCK to the security device 100, the security device 100 may generate the OK signal SOK having the off-level, and the controller may not operate in response to the OK signal SOK having the off-level. Accordingly, in the case where the display device is connected to the unauthorized analysis device or system, the controller may not operate, and thus the display device may not be reverse engineered.

As described above, the security device 100 according to embodiments may generate the OK signal SOK having the on-level only when the key signal SKEY received from the external device fits with the lock signal SLOCK (e.g., when the key signal SKEY is complementary to the lock signal SLOCK), and the electronic device (e.g., the display device) or electronic system including the security device 100 may operate normally only while the OK signal SOK has the on-level. Accordingly, the security of the electronic device or electronic system including the security device 100 may be maintained.

Figure 5:
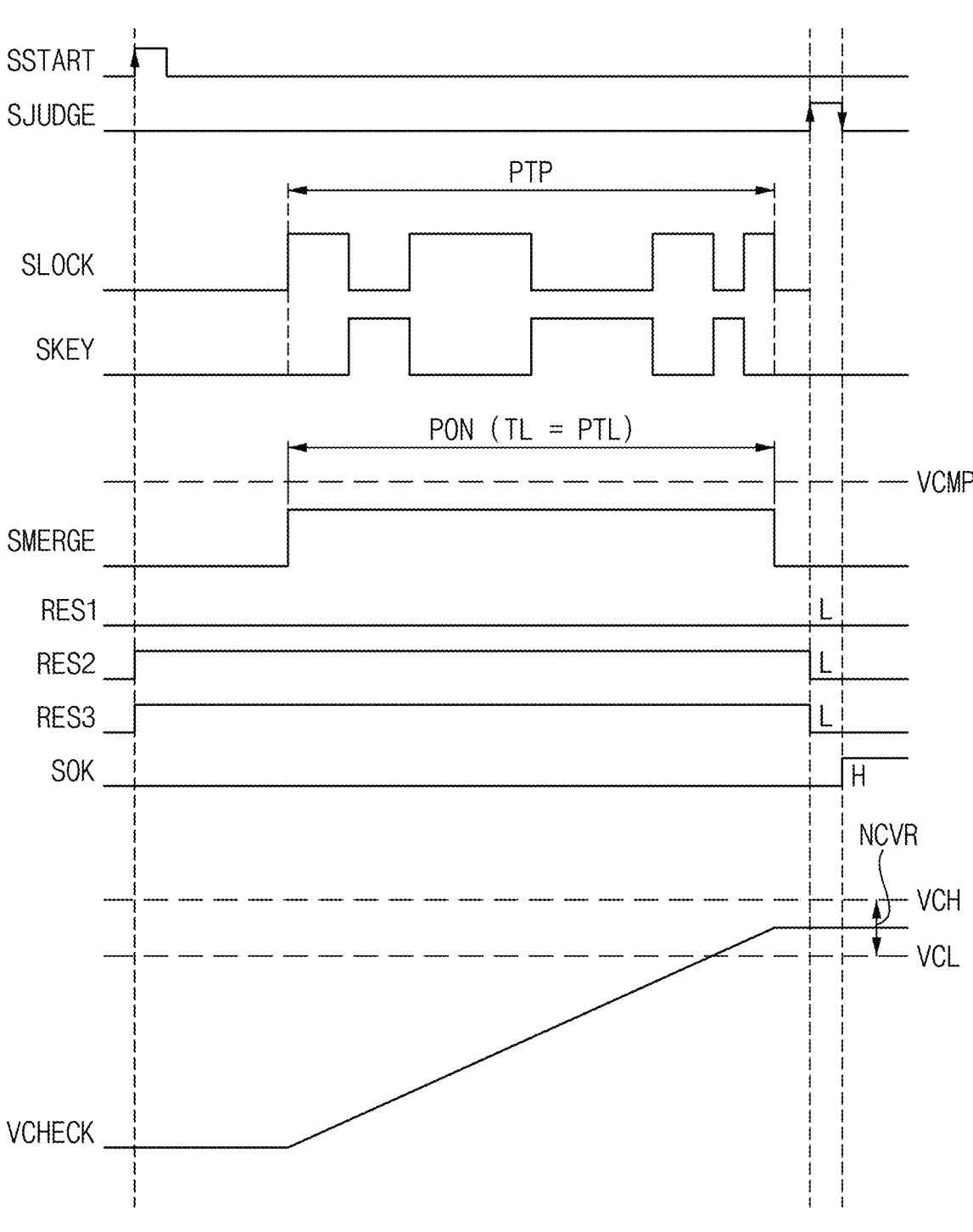
FIG. 5 is a timing diagram for describing an example of an operation of a security device which receives a key signal that fits with a lock signal.

FIG. 5 is a timing diagram for describing an example of an operation of a security device which receives a key signal that fits with a lock signal.

Referring to FIGS. 1 through 5, the security device 100 may perform an operation of determining whether the key signal SKEY received from the external device fits with the lock signal SLOCK in response to the start signal SSTART. For example, the first flip-flop 440 of the check circuit 400 may initialize the first result signal RES1 to the low level in response to the start signal SSTART, the second flip-flop 450 of the check circuit 400 may initialize the second result signal RES2 to the high level in response to the start signal SSTART, the third flip-flop 460 of the check circuit 400 may initialize the third result signal RES3 to the high level in response to the start signal SSTART, and the fourth flip-flop 480 of the check circuit 400 may initialize the OK signal SOK to the low level in response to the start signal SSTART.

As illustrated in FIG. 5, in a case where the key signal SKEY fits with the lock signal SLOCK, or in a case where, during the selected (or predetermined) time period PTP after a certain time from a rising edge of the start signal SSTART, the key signal SKEY has the low level when the lock signal SLOCK has the high level and has the high level when the lock signal SLOCK has the low level, the voltage level of the merged signal SMERGE generated by summing the lock signal SLOCK and the key signal SKEY by the summing circuit 200 may be lower than the voltage level of the comparison voltage VCMP. In this case, the first comparator 410 of the check circuit 400 may maintain the first output signal OUT1 at the low level, and the first flip-flop 440 may maintain the first result signal RES1 at the low level L. That is, the first flip-flop 440 may output the first result signal RES1 having the low level L indicating that the merge signal SMERGE does not exceed the comparison voltage VCMP.

Further, in the case where the key signal SKEY fits with the lock signal SLOCK, or in the case where the key signal SKEY is complementary to the lock signal SLOCK during the selected time period PTP, the on-period PON (e.g., the high period) of the merge signal SMERGE may coincide with the selected time period PTP, and the duration or time length TL of the on-period PON of the merge signal SMERGE may match the duration of the selected time period PTP, or the selected duration/time length PTL. Further, the check voltage generating circuit 300 may gradually increase the voltage level of the check voltage VCHECK during the on-period PON of the merge signal SMERGE. In this case, the check voltage VCHECK at the rising edge of the judgment signal SJUDGE may be between the check low voltage VCL that marks the lower limit of the normal check voltage range NCVR and the check high voltage VCH that marks the upper limit of the normal check voltage range NCVR. Thus, at the rising edge of the judgment signal SJUDGE, the second comparator 420 of the check circuit 400 may output the second output signal OUT2 having the low level, the second flip-flop 450 may output the second output signal OUT2 as the second result signal RES2, the third comparator 430 of the check circuit 400 may output the third output signal OUT3 having the low level, and the third flip-flop 460 may output the third output signal OUT3 as the third result signal RES3. That is, at the rising edge of the judgment signal SJUDGE, the second and third flip-flops 450 and 460 may output the second and third result signals RES2 and RES3 having the low level L indicating that the check voltage VCHECK is within the normal check voltage range NCVR.

After the rising edge of the judgment signal SJUDGE, since all of the first, second and third result signals RES1, RES2 and RES3 have the low level L, the NOR gate 470 of the check circuit 400 may output the fourth output signal OUT4 having the high level. At the falling edge of the judgment signal SJUDGE, the fourth flip-flop 480 of the check circuit 400 may output the fourth output signal OUT4 as the OK signal SOK. Thus, at and after the falling edge of the judgment signal SJUDGE, the security device 100 may output the OK signal SOK having the high level H. The electronic device receiving the OK signal SOK having the high level H may operate normally.

As described above, in the case where the key signal SKEY fits with the lock signal SLOCK (e.g., in the case where the key signal SKEY is complementary to the lock signal SLOCK), the merge signal SMERGE may not exceed the comparison voltage VCMP, the check voltage VCHECK may be within the normal check voltage range NCVR, and the security device 100 may output the OK signal SOK having the high level H. The electronic device (e.g., the display device) including the security device 100 may operate normally in response to the OK signal SOK having the high level H.

Figure 6:
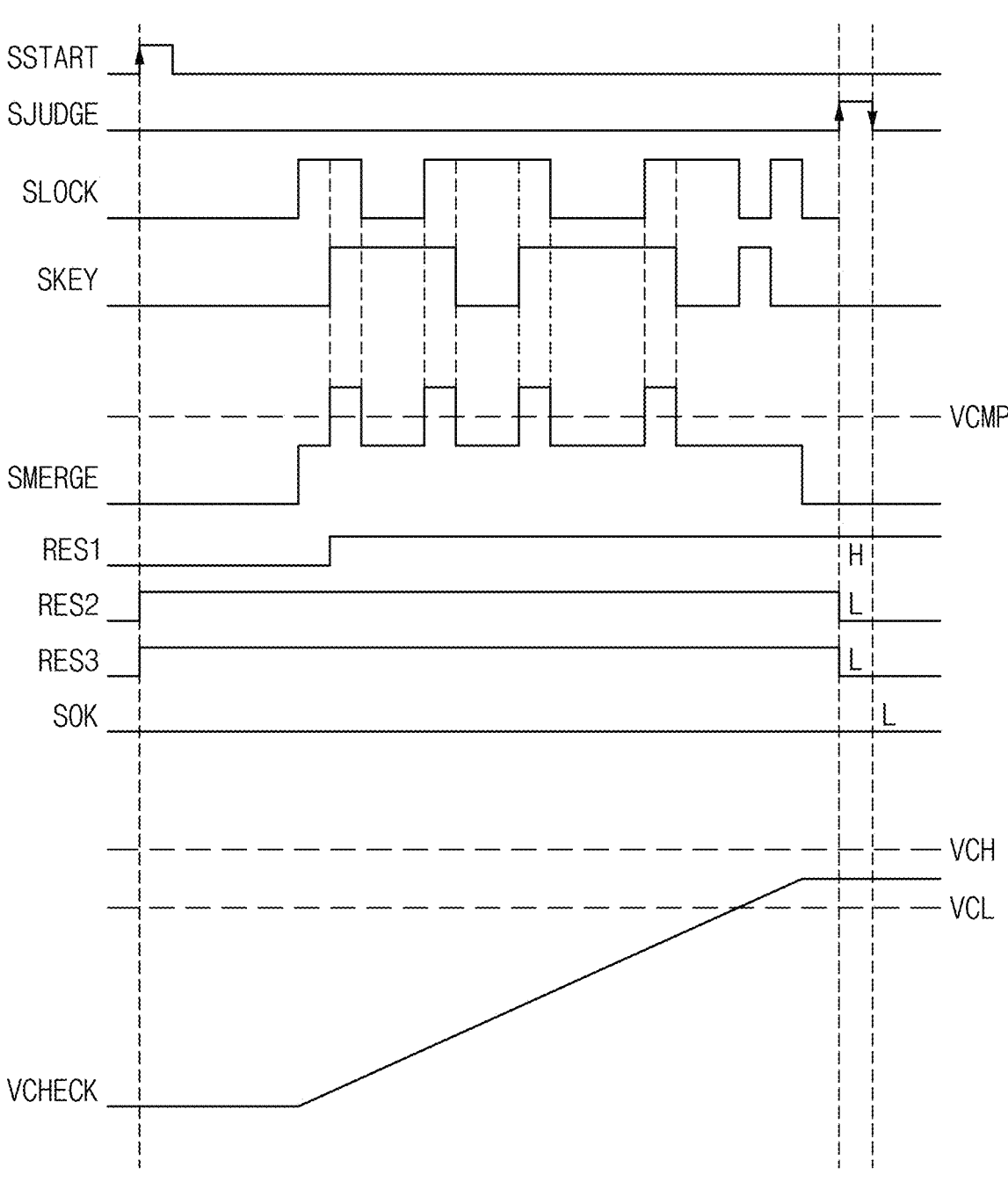
FIG. 6 is a timing diagram for describing an example of an operation of a security device which receives a key signal that does not fit with a lock signal.

FIG. 6 is a timing diagram for describing an example of an operation of a security device which receives a key signal that does not fit with a lock signal.

Referring to FIGS. 1 through 4 and FIG. 6, the security device 100 may perform an operation of determining whether the key signal SKEY received from the external device fits with the lock signal SLOCK in response to the start signal SSTART.

As illustrated in FIG. 6, in a case where the key signal SKEY does not fit with the lock signal SLOCK, in particular in a case where the lock signal SLOCK and the key signal SKEY substantially simultaneously have high levels at any time point within the time period from when the start signal SSTART is applied to when the judgment signal SJUDGE is applied, the summing circuit 200 may generate the merged signal SMERGE having the voltage level higher than the voltage level of the comparison voltage VCMP while the lock signal SLOCK and the key signal SKEY substantially simultaneously have the high levels. The first comparator 410 of the check circuit 400 may generate the first output signal OUT1 having the high level when the merged signal SMERGE is higher than the comparison voltage VCMP, and may provide the first output signal OUT1 having the high level to the preset terminal PRE of the first flip-flop 440 of the check circuit 400. The first flip-flop 440 may output the first result signal RES1 having the high level H at a time point when the first output signal OUT1 having the high level is applied, and may maintain the first result signal RES1 at the high level H after the time point. Even if the second and third result signals RES2 and RES3 have the low level L indicating that the check voltage VCHECK is within the normal check voltage range, when the first result signal RES1 has the high level H indicating that the merge signal SMERGE exceeds the comparison voltage VCMP, the NOR gate 470 of the check circuit 400 may output the fourth output signal OUT4 having the low level. At the falling edge of the judgment signal SJUDGE, the fourth flip-flop 480 of the check circuit 400 may output the OK signal SOK having the low level L based on the fourth output signal OUT4 having the low level, and then may maintain the OK signal SOK at the low level L. That is, the security device 100 may output the OK signal SOK having the low level L indicating that the key signal SKEY does not fit with the lock signal SLOCK, and the electronic device receiving the OK signal SOK having the low level L may not operate.

As described above, in the case where the key signal SKEY does not fit with the lock signal SLOCK, or in the case where the merge signal SMERGE exceeds the comparison voltage VCMP, the security device 100 may output the OK signal SOK having the low level L. The electronic device (e.g., the display device) including the security device 100 may not operate normally in response to the OK signal SOK having the low level L, and thus the security of the electronic device may be maintained.

Figure 7:
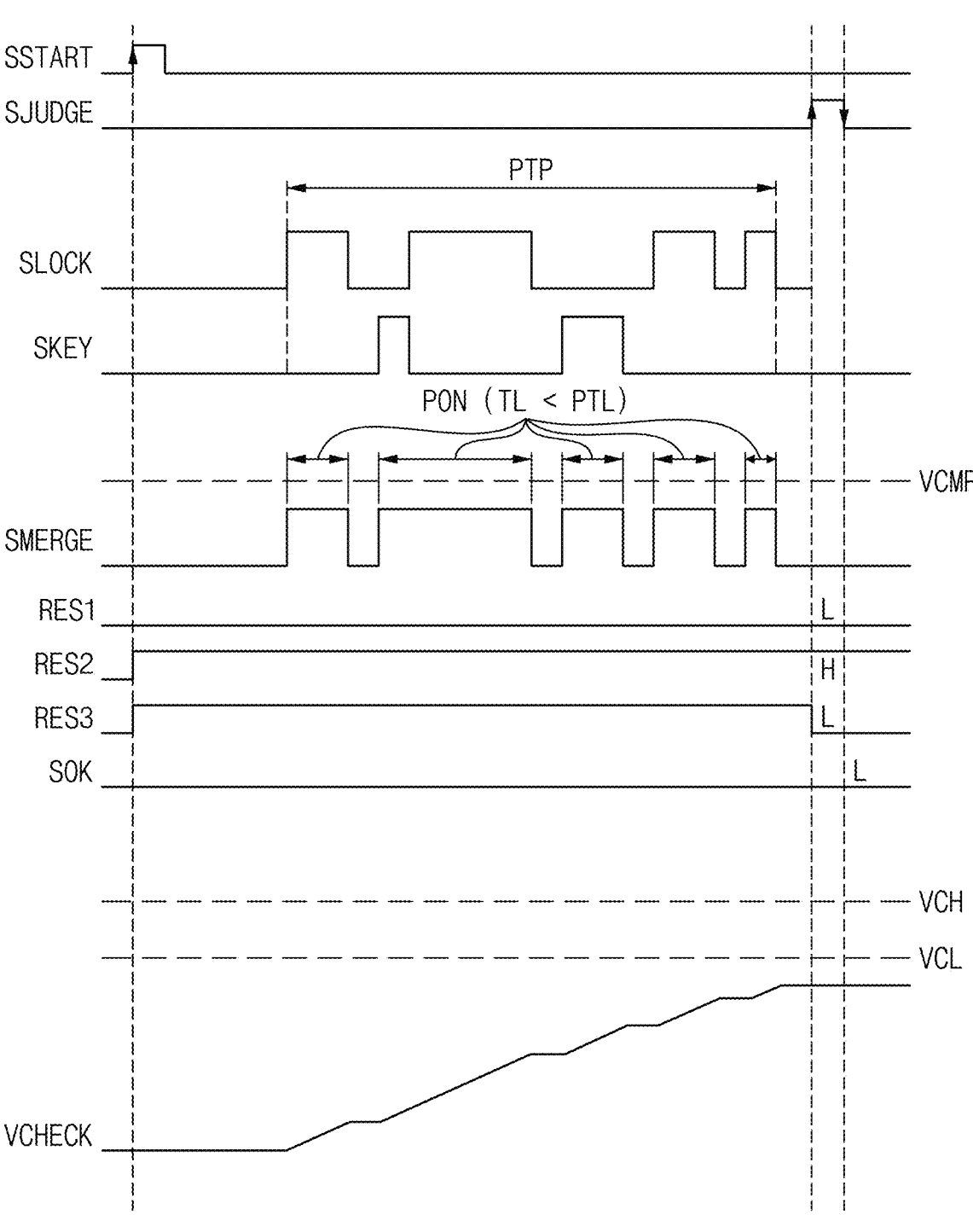
FIG. 7 is a timing diagram for describing another example of an operation of a security device which receives a key signal that does not fit with a lock signal.

FIG. 7 is a timing diagram for describing another example of an operation of a security device which receives a key signal that does not fit with a lock signal.

Referring to FIGS. 1 through 4 and FIG. 7, the security device 100 may perform an operation of determining whether the key signal SKEY received from the external device fits with the lock signal SLOCK in response to the start signal SSTART.

As illustrated in FIG. 7, in a case where the key signal SKEY does not fit with the lock signal SLOCK, in a case where the lock signal SLOCK and the key signal SKEY substantially simultaneously have the low levels within the selected time period PTP, or in a case where the low period of the lock signal SLOCK and the low period of the key signal SKEY at least partially overlap each other, the time length TL of the on-period PON (e.g., the high period) of the merged signal SMERGE generated by summing the lock signal SLOCK and the key signal SKEY by the summing circuit 200 may be shorter than the duration/time length of the selected time period PTP, or the selected time length PTL. In this case, the check voltage VCHECK generated by the check voltage generating circuit 300 may not be increased up to the check low voltage VCL that marks the lower limit of the normal check voltage range, and the check voltage VCHECK at the rising edge of the judgment signal SJUDGE may be lower than the check low voltage VCL. Thus, at the rising edge of the judgment signal SJUDGE, the second comparator 420 of the check circuit 400 may output the second output signal OUT2 having the high level, and the second flip-flop 450 may output the second result signal RES2 having the high level H indicating that the check voltage VCHECK is lower than the check low voltage VCL. Even if the first and third result signals RES1 and RES3 have the low level L, when the second result signal RES2 has the high level H, the NOR gate 470 of the check circuit 400 may output the fourth output signal OUT4 having the low level. At the falling edge of the judgment signal SJUDGE, the fourth flip-flop 480 of the check circuit 400 may output the OK signal SOK having the low level L based on the fourth output signal OUT4 having the low level, and then may maintain the OK signal SOK at the low level L. That is, the security device 100 outputs the OK signal SOK having the low level L indicating that the key signal SKEY does not fit with the lock signal SLOCK, and the electronic device receiving the OK signal SOK having the low level L may not operate.

As described above, in the case where the key signal SKEY does not fit with the lock signal SLOCK, or in the case where the check voltage VCHECK is lower than the check low voltage VCL that marks the lower limit of the normal check voltage range, the security device 100 may output the OK signal SOK having the low level L. The electronic device (e.g., the display device) including the security device 100 does not operate normally in response to the OK signal SOK having the low level L, and thus the security of the electronic device may be maintained.

Figure 8:
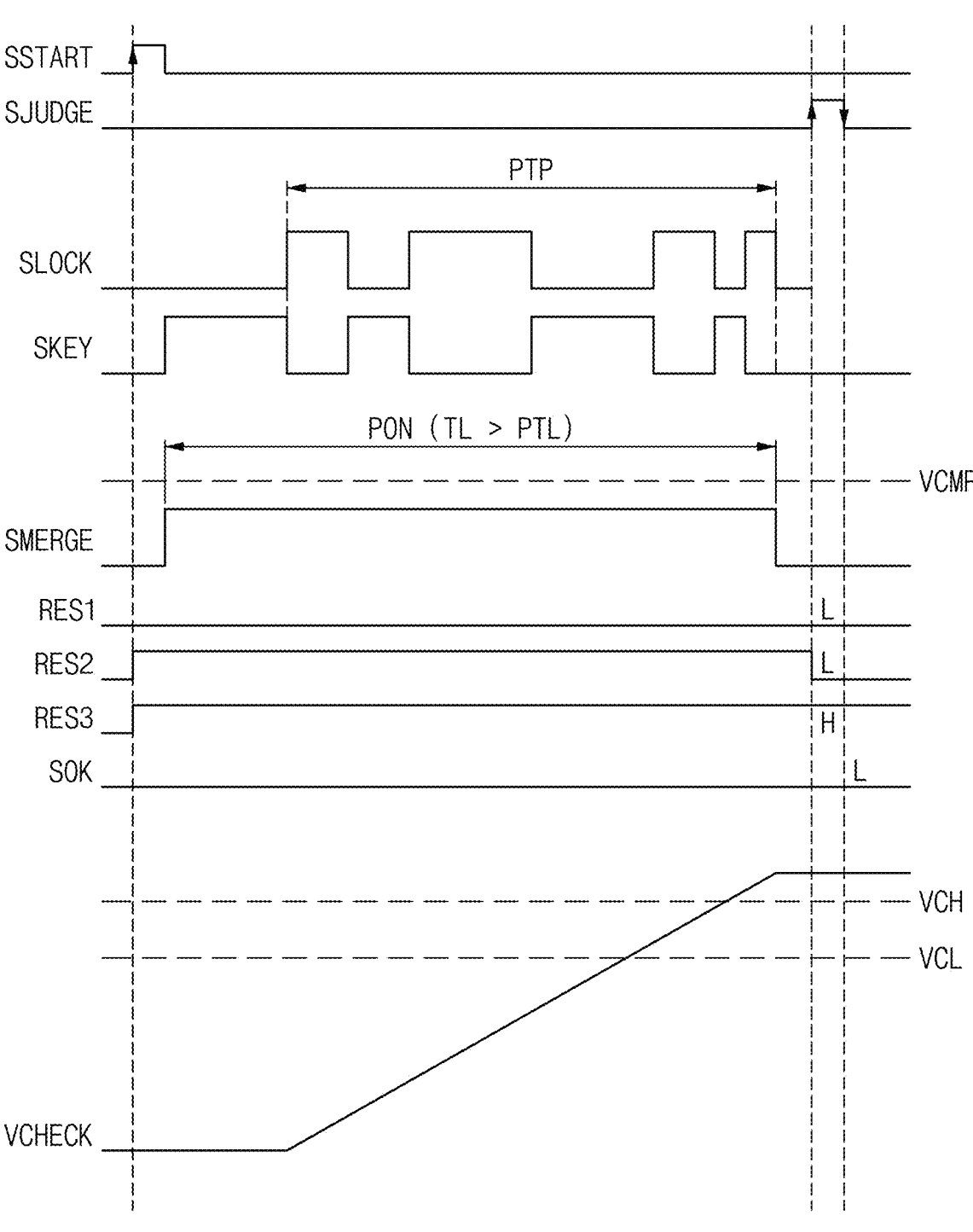
FIG. 8 is a timing diagram for describing still another example of an operation of a security device which receives a key signal that does not fit with a lock signal.

FIG. 8 is a timing diagram for describing still another example of an operation of a security device which receives a key signal that does not fit with a lock signal.

Referring to FIGS. 1 to 4 and FIG. 8, the security device 100 may perform an operation of determining whether the key signal SKEY received from the external device fits with the lock signal SLOCK in response to the start signal SSTART.

As illustrated in FIG. 8, in a case where the key signal SKEY does not fit with the lock signal SLOCK, or in a case where the key signal SKEY has the high level in a time period different from the selected time period PTP, the time length TL of the on-period PON (e.g., the high period) of the merged signal SMERGE generated by summing the lock signal SLOCK and the key signal SKEY by the summing circuit 200 may be longer than the duration/time length of the selected time period PTP, or the selected time length PTL. In this case, the check voltage VCHECK generated by the check voltage generating circuit 300 may be increased to a voltage higher than the check high voltage VCH that marks the upper limit of the normal check voltage range. Thus, at the rising edge of the judgment signal SJUDGE, the third comparator 430 of the check circuit 400 may output the third output signal OUT3 having the high level, and the third flip-flop 460 may output the third result signal RES3 having the high level H indicating that the check voltage VCHECK is higher than the check high voltage VCH. Even if the first and second result signals RES1 and RES2 have the low level L, when the third result signal RES3 has the high level H, the NOR gate 470 of the check circuit 400 may output the fourth output signal OUT4 having the low level. At the falling edge of the judgment signal SJUDGE, the fourth flip-flop 480 of the check circuit 400 may output the OK signal SOK having the low level L based on the fourth output signal OUT4 having the low level, and then may maintain the OK signal SOK at the low level L. That is, the security device 100 may output the OK signal SOK having the low level L indicating that the key signal SKEY does not fit with the lock signal SLOCK, and the electronic device receiving the OK signal SOK having the low level L may not operate.

As described above, in the case where the key signal SKEY does not fit with the lock signal SLOCK, or in the case where the key signal SKEY has the high level in the time period different from the selected time period PTP, the security device 100 may output the OK signal SOK having the low level L. The electronic device (e.g., the display device) including the security device 100 may not operate normally in response to the OK signal SOK having the low level L, and thus the security of the electronic device may be maintained.

Figure 9:
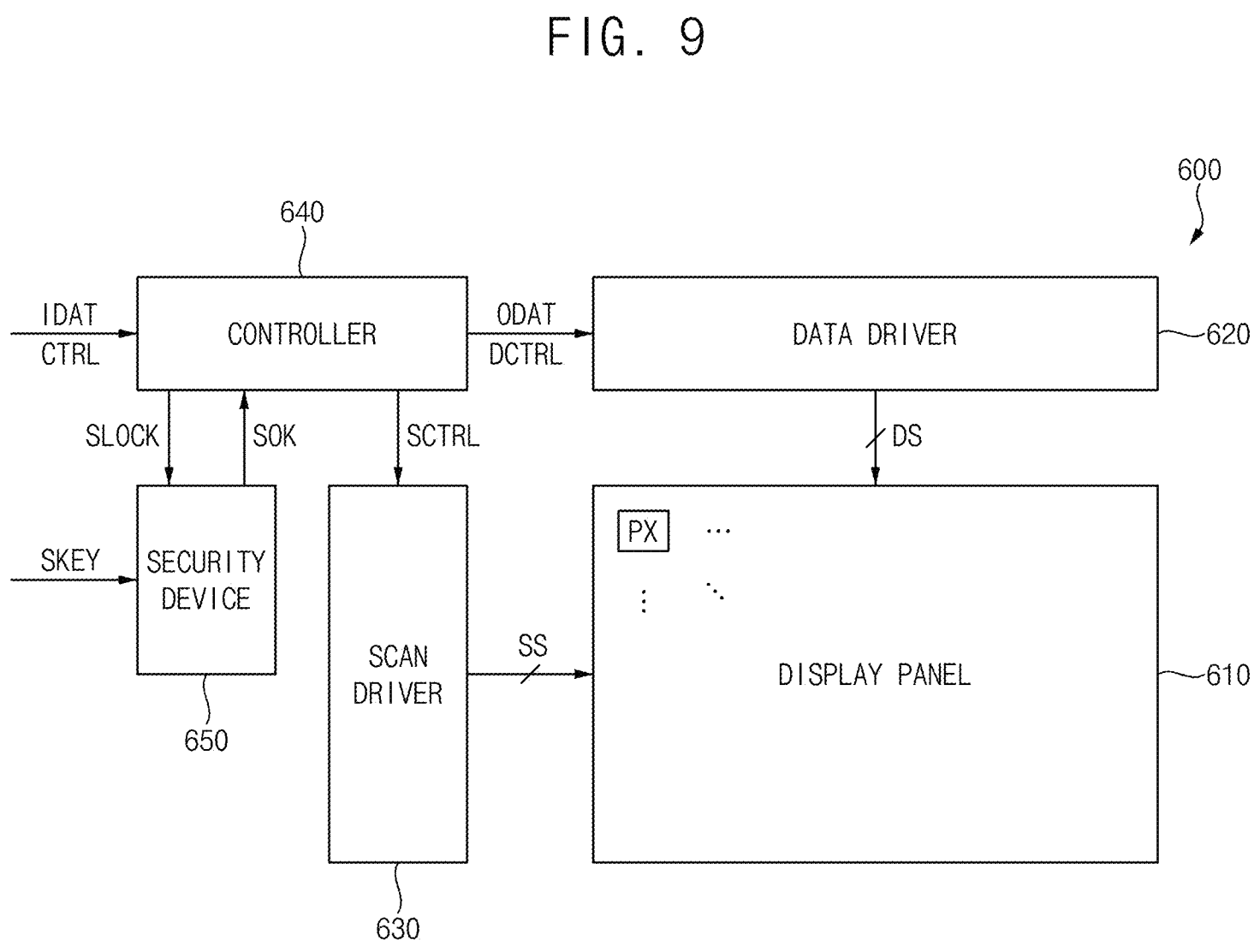

FIG. 9 is a block diagram illustrating a display device including a security device according to embodiments.

Referring to FIG. 9, a display device 600 according to embodiments may include a display panel 610 that includes a plurality of pixels PX, a data driver 620 that provides data signals DS to the plurality of pixels PX, a scan driver 630 that provides scan signals SS to the display panel 610, a controller 640 that controls the data driver 620 and the scan driver 630, and a security device 650 that generates an OK signal SOK.

The display panel 610 may include a plurality of data lines, a plurality of scan lines, and the plurality of pixels PX connected to the plurality of data lines and the plurality of scan lines. In some embodiments, each pixel PX may include a light-emitting element, and the display panel 610 may be a light-emitting display panel. For example, the light-emitting element may be an organic light-emitting diode ("OLED"), and the display panel 610 may be an OLED display panel. In other examples, the light-emitting element may be a nano light-emitting diode ("NED"), a quantum dot ("QD") light-emitting diode, a micro light-emitting diode, an inorganic light-emitting diode, or any other suitable light-emitting element. In other embodiments, each pixel PX may include a switching transistor and a liquid crystal capacitor connected to the switching transistor, and the display panel 610 may be a liquid crystal display ("LCD") panel. However, the display panel 610 is not limited to the light-emitting display panel and the LCD panel, and may be any suitable display panel.

The data driver 620 may generate the data signals DS based on a data control signal DCTRL and output image data ODAT received from the controller 640, and may provide the data signals DS prescribed by the output image data ODAT to the plurality of pixels PX through the plurality of data lines. In some embodiments, the data control signal DCTRL may include, but is not limited to, an output data enable signal, a horizontal start signal and a load signal. In some embodiments, the data driver 620 and the controller 640 may be implemented as a single integrated circuit, and the single integrated circuit may be referred to as a timing controller embedded data driver ("TED") integrated circuit. In other embodiments, the data driver 620 and the controller 640 may be implemented as separate integrated circuits.

The scan driver 630 may generate the scan signals SS based on a scan control signal SCTRL received from the controller 640, and may sequentially provide the scan signals SS to the plurality of pixels PX on a row-by-row basis through the plurality of scan lines. In some embodiments, the scan control signal SCTRL may include, but is not limited to, a scan start signal, a scan clock signal, etc. In some embodiments, the scan driver 630 may be integrated or formed in the display panel 610. In other embodiments, the scan driver 630 may be implemented as one or more integrated circuits.

The controller 640 (e.g., a timing controller) may receive input image data IDAT and a control signal CTRL from an external processor (e.g., an application processor ("AP"), a graphics processing unit ("GPU") or a graphics card). In some embodiments, the control signal CTRL may include, but is not limited to, a vertical synchronization signal, a horizontal synchronization signal, an input data enable signal, a master clock signal, etc. The controller 640 may generate the output image data ODAT, the data control signal DCTRL and the scan control signal SCTRL based on the input image data IDAT and the control signal CTRL. The controller 640 may control the data driver 620 by providing the output image data ODAT and the data control signal DCTRL to the data driver 620, and may control the scan driver 630 by providing the scan control signal SCTRL to the scan driver 630.

When the display device 600 is powered on, the security device 650 may receive a key signal SKEY from an external device (e.g., the external processor), may receive a lock signal SLOCK from the controller 640, and may perform an operation of determining whether the key signal SKEY fits with the lock signal SLOCK. In some embodiments, the security device 650 may further receive a start signal, a judgment signal, a comparison voltage, a check low voltage and a check high voltage from the controller 640. The security device 650 may generate the OK signal SOK having an on-level in a case where the key signal SKEY fits with the lock signal SLOCK (e.g., in a case where the key signal SKEY is complementary to the lock signal SLOCK), and may generate the OK signal SOK having an off-level in a case where the key signal SKEY does not fit with the lock signal SLOCK (e.g., in a case where the key signal SKEY is not complementary to the lock signal SLOCK). The controller 640 may operate normally when the OK signal SOK has the on-level, and may not operate when the OK signal SOK has the off-level. Accordingly, in a case where the external device does not provide the key signal SKEY that fits with the lock signal SLOCK, the display device 600 may not operate, and the security of the display device 600 may be maintained.

Figure 10:
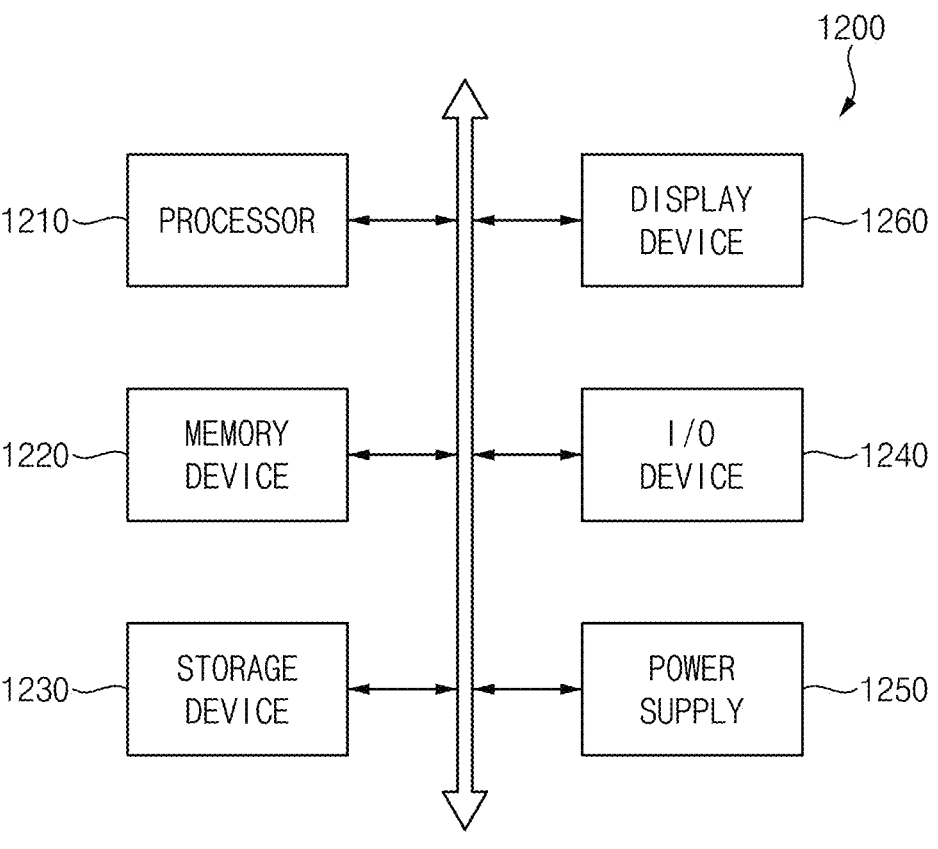
FIG. 10 is a block diagram illustrating an electronic device including a display device according to embodiments.

FIG. 10 is a block diagram illustrating an electronic device including a display device according to embodiments.

Referring to FIG. 10, an electronic device 1200 may include a processor 1210, a memory device 1220, a storage device 1230, an input/output (I/O) device 1240, a power supply 1250 and a display device 1260. The electronic device 1200 may further include a plurality of ports for communicating with a video card, a sound card, a memory card, a universal serial bus ("USB") device, other electric devices, etc.

The processor 1210 may perform various computing functions or tasks. The processor 1210 may be an application processor ("AP"), a micro-processor, a central processing unit ("CPU"), etc. The processor 1210 may be coupled to other components via an address bus, a control bus, a data bus, etc. Further, in some embodiments, the processor 1210 may be further coupled to an extended bus such as a peripheral component interconnection ("PCI") bus.

The memory device 1220 may store data for operations of the electronic device 1200. For example, the memory device 1220 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1230 may be a solid state drive ("SSD") device, a hard disk drive ("HDD") device, a compact disc-read only memory ("CD-ROM") device, etc. The I/O device 1240 may be an input device such as a keyboard, a keypad, a mouse, a touch screen, etc., and an output device such as a printer, a speaker, etc. The power supply 1250 may supply power for operations of the electronic device 1200. The display device 1260 may be coupled to other components through the buses or other communication links.

In the display device 1260, a security device may receive a key signal from an external device (e.g., the processor 1210), and may generate an OK signal having an on-level only when the key signal fits with a lock signal (e.g., when the key signal is complementary to the lock signal). Further, the display device 1260 may normally operate only while the OK signal has the on-level. Accordingly, security of the display device 1260 and the electronic device 1200 may be maintained.

The inventive concepts may be applied any electronic device 1200 including the display device 1260. For example, the inventive concepts may be applied to a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A security device comprising:
a summing circuit configured to receive a key signal and generate a merged signal by summing a lock signal and the key signal;
a check voltage generating circuit configured to generate a check voltage having a voltage level corresponding to a duration of an on-period of the merged signal; and
a check circuit configured to check whether the merged signal exceeds a comparison voltage, to check whether the check voltage is within a normal check voltage range, and to generate an OK signal having an on-level if the merged signal does not exceed the comparison voltage and the check voltage is within the normal check voltage range.

2. The security device of claim 1, wherein the check circuit generates the OK signal having the on-level if the key signal is complementary to the lock signal, and generates the OK signal having an off-level if the key signal is not complementary to the lock signal.

3. The security device of claim 1, wherein the summing circuit generates the merged signal higher than the comparison voltage when the lock signal and the key signal have a high level simultaneously, and
wherein the check circuit generates the OK signal having an off-level based on the merged signal being higher than the comparison voltage.

4. The security device of claim 1, wherein the check voltage generating circuit generates the check voltage that is outside of the normal check voltage range when the duration of the on-period of the merged signal does not match a selected duration, and wherein the check circuit generates the OK signal having an off-level based on the check voltage being outside of the normal check voltage range.

5. The security device of claim 1, wherein the summing circuit includes:
an operational amplifier including an inverting input terminal, a non-inverting input terminal, and an output terminal at which the merged signal is output;
a first resistor including a first terminal which receives a ground voltage, and a second terminal connected to the inverting input terminal;
a second resistor including a first terminal connected to the inverting input terminal, and a second terminal connected to the output terminal;
a third resistor including a first terminal which receives the lock signal, and a second terminal connected to the non-inverting input terminal; and
a fourth resistor including a first terminal which receives the key signal, and a second terminal connected to the non-inverting input terminal.

6. The security device of claim 1, wherein the check voltage generating circuit includes:
a constant current source configured to output a constant current during the on-period of the merge signal; and
a capacitor configured to generate the check voltage based on the constant current.

7. The security device of claim 6, wherein the constant current source includes an enable terminal which receives the merge signal, and a current output terminal at which the constant current is output, and
wherein the capacitor includes a first electrode connected to the current output terminal, and a second electrode which receives a ground voltage.

8. The security device of claim 1, wherein the check circuit includes:
a first comparator configured to compare the merged signal with the comparison voltage;
a second comparator configured to compare the check voltage with a check low voltage that marks a lower limit of the normal check voltage range;
a third comparator configured to compare the check voltage with a check high voltage that marks an upper limit of the normal check voltage range;
a first flip-flop configured to generate a first result signal indicating whether the merged signal exceeds the comparison voltage based on a first output signal of the first comparator;
a second flip-flop configured to generate a second result signal indicating whether the check voltage is lower than the check low voltage based on a second output signal of the second comparator;
a third flip-flop configured to generate a third result signal indicating whether the check voltage is higher than the check high voltage based on a second output signal of the third comparator;
a NOR gate configured to perform a NOR operation on the first result signal, the second result signal and the third result signal; and
a fourth flip-flop configured to output a fourth output signal of the NOR gate as the OK signal in response to a judgment signal.

9. The security device of claim 8, wherein the first comparator includes a non-inverting input terminal which receives the merge signal, an inverting input terminal which receives the comparison voltage, and an output terminal outputting the first output signal, the first output signal having a high level when the merge signal is higher than the comparison voltage and having a low level when the merge signal is lower than the comparison voltage, wherein the second comparator includes a non-inverting input terminal which receives the check low voltage, an inverting input terminal which receives the check voltage, and an output terminal outputting the second output signal, the second output signal having a low level when the check voltage is higher than the check low voltage and having a high level when the check voltage is lower than the check low voltage, and wherein the third comparator includes a non-inverting input terminal which receives the check voltage, an inverting input terminal which receives the check high voltage, and an output terminal outputting the third output signal, the third output signal having a low level when the check voltage is lower than the check high voltage and having a high level when the check voltage is higher than the check high voltage.

10. The security device of claim 9, wherein the first flip-flop includes a clear terminal which receives a start signal, a preset terminal which receives the first output signal, and an output terminal outputting the first result signal, the first result signal having a low level when the first output signal is maintained at a low level and having a high level when the first output signal changes to a high level, wherein the second flip-flop includes a preset terminal which receives the start signal, a data input terminal which receives the second output signal, a clock terminal which receives the judgment signal, and an output terminal outputting the second result signal, wherein the second output signal is output as the second result signal at a rising edge of the judgment signal, and wherein the third flip-flop includes a preset terminal which receives the start signal, a data input terminal which receives the third output signal, a clock terminal which receives the judgment signal, and an output terminal outputting the third result signal, wherein the third output signal is output as the third result signal at the rising edge of the judgment signal.

11. The security device of claim 10, wherein the NOR gate includes a first input terminal which receives the first result signal, a second input terminal which receives the second result signal, a third input terminal which receives the third result signal, and an output terminal outputting the fourth output signal, the fourth output signal having a high level if the first, second and third result signals simultaneously have a low level, and the fourth output signal having a low level when at least one of the first, second and third result signals has a high level, and wherein the fourth flip-flop includes a clear terminal which receives the start signal, a data input terminal which receives the fourth output signal, a clock terminal which receives the judgment signal, and an output terminal outputting the fourth output signal as the OK signal at a falling edge of the judgment signal.

12. The security device of claim 1, wherein the check circuit provides the OK signal to a controller of a display device, and wherein the controller operates normally when the OK signal has the on-level, and does not operate when the OK signal has an off-level.

13. A display device comprising:

a display panel including a plurality of pixels;

a data driver configured to provide data signals to the plurality of pixels;

a scan driver configured to provide scan signals to the plurality of pixels;

a controller configured to control the data driver and the scan driver, and to generate a lock signal; and a security device configured to receive a key signal from an external device, and to generate an OK signal having an on-level if the key signal fits with the lock signal, wherein the controller operates normally when the OK signal has the on-level, and does not operate when the OK signal has an off-level, and wherein the security device includes:

a summing circuit configured to generate a merged signal by summing the lock signal and the key signal;

a check voltage generating circuit configured to generate a check voltage having a voltage level corresponding to a duration of an on-period of the merged signal; and a check circuit configured to check whether the merged signal exceeds a comparison voltage, to check whether the check voltage is within a normal check voltage range, and to generate the OK signal having the on-level if the merged signal does not exceed the comparison voltage and the check voltage is within the normal check voltage range.

14. The display device of claim 13, wherein the summing circuit generates the merged signal higher than the comparison voltage when the lock signal and the key signal have a high level simultaneously, and wherein the check circuit generates the OK signal having the off-level based on the merged signal being higher than the comparison voltage.

15. The display device of claim 13, wherein the check voltage generating circuit generates the check voltage that is outside of the normal check voltage range when the duration of the on-period of the merged signal does not match a selected duration, and wherein the check circuit generates the OK signal having the off-level based on the check voltage being outside of the normal check voltage range.

16. The display device of claim 13, wherein the summing circuit includes:

an operational amplifier including an inverting input terminal, a non-inverting input terminal, and an output terminal at which the merged signal is output;

a first resistor including a first terminal which receives a ground voltage, and a second terminal connected to the inverting input terminal;

a second resistor including a first terminal connected to the inverting input terminal, and a second terminal connected to the output terminal;

a third resistor including a first terminal which receives the lock signal, and a second terminal connected to the non-inverting input terminal; and a fourth resistor including a first terminal which receives the key signal, and a second terminal connected to the non-inverting input terminal.

17. The display device of claim 13, wherein the check voltage generating circuit includes:

a constant current source configured to output a constant current during the on-period of the merge signal; and a capacitor configured to generate the check voltage based on the constant current.

18. The display device of claim 13, wherein the check circuit includes:

a first comparator configured to compare the merged signal with the comparison voltage;

a second comparator configured to compare the check voltage with a check low voltage that marks a lower limit of the normal check voltage range;

a third comparator configured to compare the check voltage with a check high voltage that marks an upper limit of the normal check voltage range;

a first flip-flop configured to generate a first result signal indicating whether the merged signal exceeds the comparison voltage based on a first output signal of the first comparator;

a second flip-flop configured to generate a second result signal indicating whether the check voltage is lower than the check low voltage based on a second output signal of the second comparator;

a third flip-flop configured to generate a third result signal indicating whether the check voltage is higher than the check high voltage based on a second output signal of the third comparator;

a NOR gate configured to perform a NOR operation on the first result signal, the second result signal and the third result signal; and a fourth flip-flop configured to output a fourth output signal of the NOR gate as the OK signal in response to a judgment signal.

19. An electronic device comprising:

a processor configured to provide input image data; and a display device configured to receive the input image data from the processor, and to display an image based on the input image data, the display device including:

a display panel including a plurality of pixels;

a data driver configured to provide data signals to the plurality of pixels;

a scan driver configured to provide scan signals to the plurality of pixels;

a controller configured to control the data driver and the scan driver, and to generate a lock signal; and a security device configured to receive a key signal from an external device, and to generate an OK signal having an on-level if the key signal fits with the lock signal, wherein the controller operates normally when the OK signal has the on-level, and does not operate when the OK signal has an off-level, and wherein the security device includes:

a summing circuit configured to generate a merged signal by summing the lock signal and the key signal;

a check voltage generating circuit configured to generate a check voltage having a voltage level corresponding to a duration of an on-period of the merged signal; and a check circuit configured to check whether the merged signal exceeds a comparison voltage, to check whether the check voltage is within a normal check voltage range, and to generate the OK signal having the on-level if the merged signal does not exceed the comparison voltage and the check voltage is within the normal check voltage range.

* * * * *